United States Patent [19]

Rucker et al.

[11] Patent Number: 4,985,610
[45] Date of Patent: Jan. 15, 1991

[54] CUTTING TORCH

[75] Inventors: Klaus G. Rucker, Kinnelon, N.J.; Walter J. Simmons; Larry T. Stilwell, both of Martinsburg, W. Va.

[73] Assignee: E. I. du Pont de Nemours and Company, Wilmington, Del.

[21] Appl. No.: 393,947

[22] Filed: Aug. 15, 1989

Related U.S. Application Data

[63] Continuation-in-part of Ser. No. 199,231, May 26, 1988.

[51] Int. Cl.$^5$ .................. B23K 35/04; B23K 7/00
[52] U.S. Cl. .................... 219/70; 219/69.1; 219/74; 266/75; 266/47
[58] Field of Search ............ 219/70, 69 R, 74, 75, 219/121.5, 121.53, 121.48, 121.51; 266/75, 77, 48

[56] References Cited

U.S. PATENT DOCUMENTS

| | | | |
|---|---|---|---|
| 3,220,459 | 11/1965 | Wilson | 219/70 |
| 4,541,616 | 9/1985 | Dean | 219/70 |
| 4,597,563 | 7/1986 | Persbeck | 219/70 |
| 4,625,094 | 11/1986 | Marhic et al. | 219/121.48 |
| 4,654,496 | 3/1987 | DeMarsh et al. | 219/74 |
| 4,660,807 | 4/1987 | Campara | 219/70 |

Primary Examiner—M. H. Paschall
Attorney, Agent, or Firm—Charles E. Krukiel

[57] ABSTRACT

A cutting device which includes an external tube, an internal tube disposed within the external tube, and a number of steel rods or wires housed within the internal tube. A squib, with or without additional fuel, is disposed within the external tube and adjacent to one end of the internal tube. A plurality of vent holes are provided on the periphery of the external tube to allow the combustion gases to exhaust therethrough. The vent holes are located away from the squib but adjacent to the end of the internal tube. One of the open ends of the external tube is sealed with a plug.

9 Claims, 3 Drawing Sheets

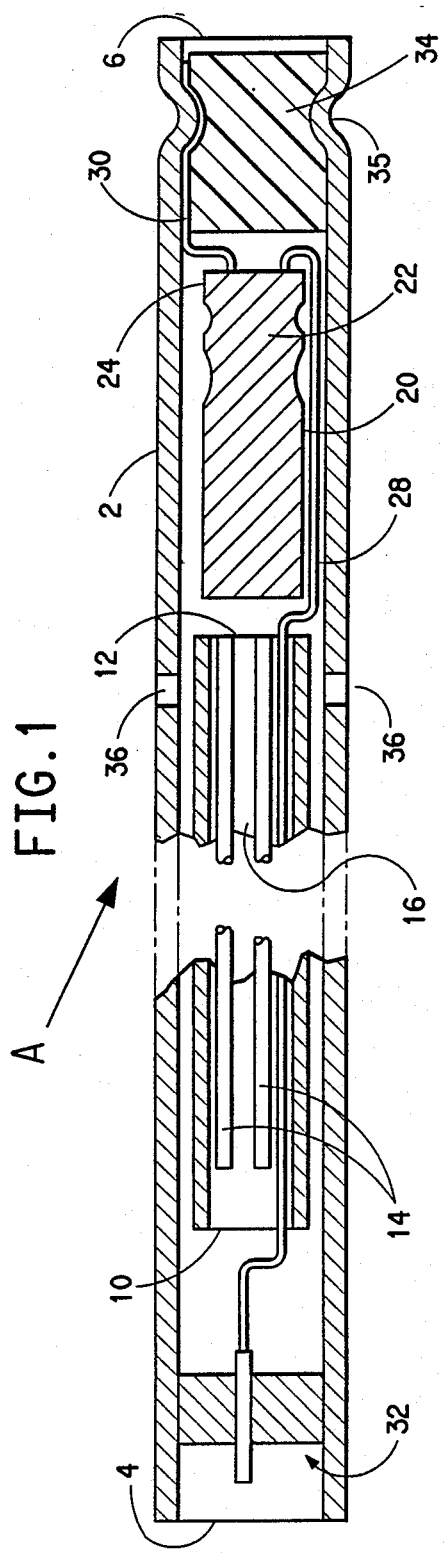
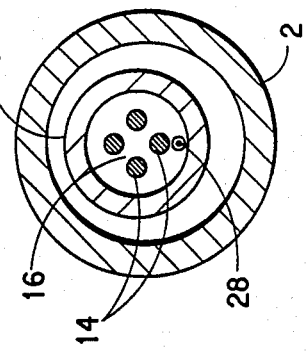
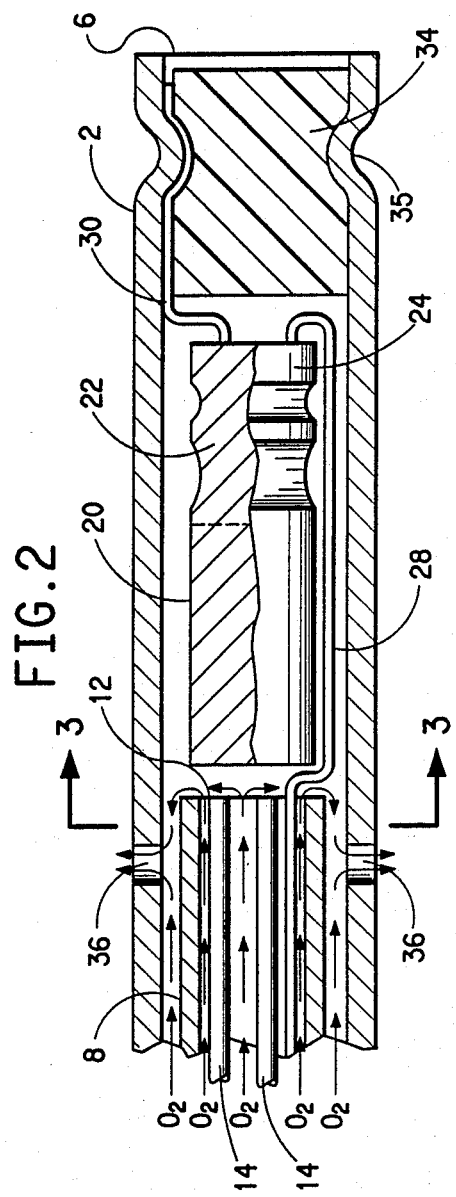

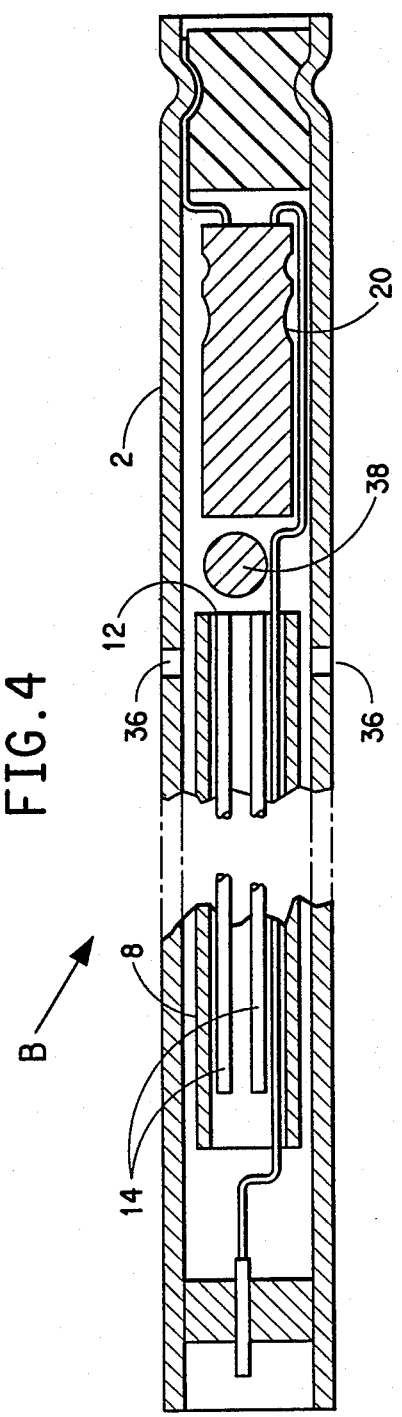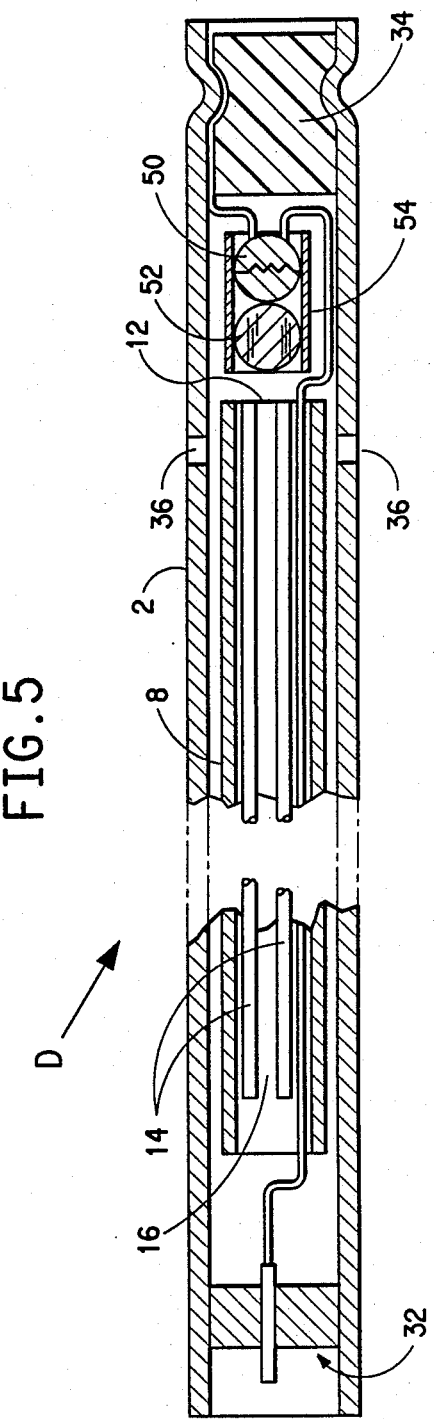

CUTTING TORCH

This is a continuation-in-part of U.S. Application Ser. No. 199,231, filed May 26, 1988.

BACKGROUND AND FIELD OF INVENTION

The present invention is directed to a lance or torch for a cutting tool for burning through steel, masonry, concrete, metal-smelter plugs, and the like.

Conventional torches are generally exothermic burning rods which include a steel tube or tubes with steel wires or rods inside, wherein oxygen is circulated through the tubes and around the wires. The steel tubes and wires are ignited at one end of the tube or tubes by passing high current through the rods or by placing the end of the rods in a smoldering cardboard punk tube. The oxygen causes the smoldering tube to burn rapidly and the combustion gases and the flames coming out from the steel tube and around wires heat them sufficiently to ignite. Once ignited, the steel sustains combustion for a sufficiently long period of time until the rods are completely spent. The hot combustion products and excess oxygen flowing from the end of the burning tube and wires are sufficiently hot to burn through almost any material, including steel, stainless steel, fire bricks, and the like.

The prior art is replete with cutting torches that may be used in the open air or underwater. The examples of such torches and devices are disclosed in U.S. Pat. Nos. 3,260,076; 3,487,791; 3,500,774; 3,507,230; 3,507,231; 3,592,573; 3,658,599; 3,713,636; 3,994,666; 4,069,407; 4,114,863; 4,131,780; 4,182,947; 4,401,040; 4,416,444; 4,477,060; 4,495,848; 4,541,616; 4,559,890; 4,601,761; and 4,654,496. Additional examples are disclosed in British No. 2,151,530, Japanese No. 50 035049 and Japanese No. 78 44902.

However, conventional devices suffer with many disadvantages. For example, the torches that are used in the open air can be ignited by striking with a 50 ampere or greater arc at the tube rim, or by fanning a smoldering cardboard tube with oxygen to a white-hot flame. However, batteries required to provide the igniting current, usually of the motorcycle/automobile battery type are heavy, awkward to use, and require recharging. Additionally, igniting the cardboard punk tube in rain or under windy conditions has been observed to be difficult, and further hazardous on a scaffold or the like. Moreover, both of these igniting methods are almost useless when the torch is used underwater. The underwater objects generally have a high resistance and cannot be made part of a 50 ampere or greater ignition circuit or, conversely, a very high and dangerous voltage is necessary to overcome barnacles, slimy algae and the like.

The underwater cutting rod disclosed in U.S. Pat. Nos. 4,069,407 and 4,182,197, to Brower, uses a continuous 100 ampere or greater welding current with an oxygen-fed hollow electrode. The steady flow of current helps in underwater ignition, however, establishing the return path through the structure being cut is difficult. Moreover, the underwater use of high intensity currents poses great danger of bodily harm to the operator.

In addition to the above, although the smoldering cardboard tube or high intensity current flow through the tubes methods of igniting (generally provided by an automotive type of battery) are useful in many applications, they are not favored during rescue and emergency types of situations because of the time required to ignite the cardboard tube or handling of the bulky battery ignition system. Moreover, these ignition systems do not function properly at all during underwater cutting operations.

In view of the problems encountered, there is a need for a cutting torch which is highly reliable as to the ignition, sufficiently heat-resistant to resist flash fires, functions well under the effects of intense cold or ice-water, easily portable, ignites fast, and which does not pose a danger to the operator.

OBJECTS AND SUMMARY OF THE INVENTION

It is, therefore, an object of the present invention to provide a cutting device which overcomes the aforementioned disadvantages of the conventional cutting devices.

It is another object of the present invention to provide a cutting device which is highly reliable as to its ignition in air and underwater.

It is yet another object of the present invention to provide a cutting device which is heat-resistant to flash fires and therefore safe to store.

A further object of the present invention is to provide a cutting device which is highly reliable and performs well during rescue and emergency operations.

Yet a further object of the present invention is to provide a cutting device which is lightweight, easily portable and uses a very low current to ignite.

Still a further object of the present invention is to provide a cutting device which uses an electrically ignited squib to ignite the torch within a fraction of a second.

An additional object of the present invention is to provide an underwater cutting device which is quickly ignited.

Yet an additional object of the present invention is to provide an underwater cutting device which uses unsealed lances which can be mounted or reloaded into a handle under water very quickly or within seconds.

Another object of the present invention is to provide a cutting device in which the oxygen flows along and over the ends of the rods, to provide a hot and uniform flame.

Yet another object is to provide a cutting device in which the oxygen flow is reversed in the area adjacent the ends of the rods to provide sufficient oxygen for burning and proper ignition.

Still another object of this invention is to provide means for quickly and efficiently removing exhaust and spent gases from the area of direct burn whereby to avoid incomplete combustions.

In summary, the object of the present invention is to provide a cutting device which is very portable and uses a very small electric source to ignite a squib or an electric match.

BRIEF DESCRIPTION OF THE DRAWINGS

The above and other objects and advantages and novel features of the present invention will become apparent from the following detailed description of the preferred embodiments of the invention illustrated in the accompanying drawings, in which:

FIG. 1 is a cross-sectional view of a lance or torch for a cutting device in accordance with the present invention;

FIG. 2 is an enlarged partial cross-sectional view of the cutting device of the present invention;

FIG. 3 is a cross-sectional view taken along line 3-3 of FIG. 2;

FIG. 4 is a cross-sectional view of a second embodiment of the cutting device of the present invention;

FIG. 5 is a cross-sectional view of a third embodiment of the cutting device of the present invention;

DETAILED DESCRIPTION OF THE INVENTION

Figure 6:
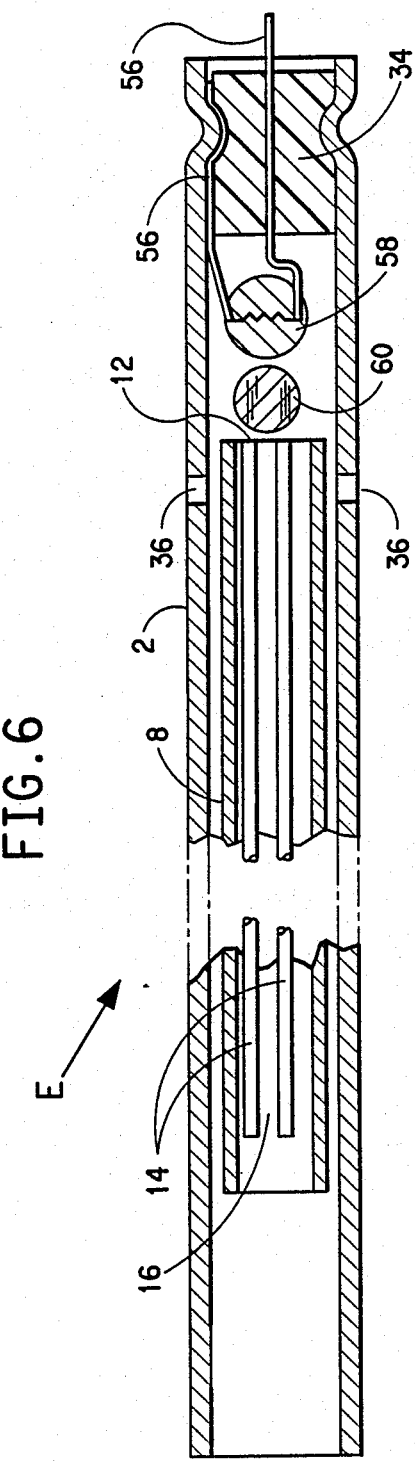
FIG. 6 is a cross-sectional view of a fourth embodiment of the cutting device of the present invention.

As shown in FIG. 1, the cutting device includes a lance A which is connected with the handle of an entire torch device (not shown). Lance A is formed of an external tube 2 with open ends 4 and 6. An internal tube 8 is coaxial with external tube 2 and is disposed therein. The internal tube 8 includes ends 10 and 12 corresponding with ends 4 and 6, respectively, of external tube 2. As shown in FIG. 1, the length of internal tube 8 is substantially less than the length of the external tube 2. A number of rods or wires 14, which are fusible, are housed within the internal tube 8. As best shown in FIG. 3, rods 14 define a space 16 therebetween to allow oxygen or the like from a source not shown to flow therethrough. The external and internal tubes 2 and 8, and rods or wires 14, are all made of a suitable conventional metal, such as steel. It should be noted that, although only four rods 14 are shown herein, this number can be varied in order to accommodate the operator's specifications.

A squib 20, or the like, is placed within external tube 2 adjacent the end 12 of internal tube 8. The squib 20 includes a suitable charge 22 enclosed in a shell 24. The squib shell 24 is made of a suitable conventional material, such as aluminum. The squib charge 22 may preferably be composed of a 15/85 boron, ferric oxide ignition charge and a 37/50/13 magnesium, ferric oxide, and potassium perchlorate base charge enclosed within squib-shell 24. Squib 20 requires a firing current of about ¾ ampere and reacts within one-tenth of a second to produce an incandescent white-glowing mass of magnesium, aluminum and iron, that instantly reacts with the oxygen stream to create temperatures in the 2000+° C. range. Additionally, squib 20 is made so as to be heat-resistant and can withstand temperatures of up to 240° C. for one day.

Lance A further includes ignition wires 28 and 30 for carrying the firing current from an electrical connector 32 to the squib 20. The electrical connector 32 is connected via conventional means to an electric source (not shown) for supplying the firing currents for igniting the squib 20.

As shown in FIG. 1, wire 28 may run along rods or wires 14, inside the internal tube 8; or, alternatively, it may run through a space between external tube 2 and internal tube 8. Wire 30, which is bare-ended, on the other hand, may be secured between plug 34 and external tube 2.

Plug 34, made of plastic or metal, preferably copper, is used to seal open end 6 of external tube 2. The plug 34 is securely positioned in external tube 2 by a crimp 35 which establishes &.he electrical return connection through external tube 2. The other end 4 of external tube 2 may be left open to make a connection with the handle of a torch (not shown).

Since the end 4 of external tube 2 is unsealed, lance A of the present invention may be loaded and unloaded from the handle of the torch under the water without having to worry about the integrity of the seal. This construction further makes it convenient to mount and unmount several lances within seconds during rescue or emergency operations The external tube 2 is provided with holes 36 to allow the combustion gases to vent therethrough. Holes 36 are provided on the periphery of external tube 2 and may preferably be located at one-sixteenth (1/16) of one inch to one inch away from the end 12 of internal tube 8 and towards the end 4 of external tube 2. Preferably, four holes are provided for adequate venting in case the internal tube 8 blocks or closes one or two of the holes 36. However, successful ignitions have been obtained with only two holes, and even one hole could be used if it is sufficiently large in size. Preferably, the diameter of holes 36 may be from about 1/16 to 1/8 of one inch. Other similar openings, such as slits, may also be provided in place of holes 36.

As shown in FIG. 2, the oxygen flowing through space 16 between the rods 14 comes out of the open end 12 of internal tube 8 and flows back over the ends of rods 14 and internal tube 8 before it is exhausted or vented through holes 36.

FIG. 4 discloses a second embodiment of the present invention, which is similar to the lance A shown in FIG. 1 with the exception of additional fuel 38 placed between squib 20 and end 12 of internal tube 8. Additional fuel 38, which burns slowly from the heat provided by squib 20, is provided to prolong the burning time within lance B to thereby allow the hot combustion gases to ignite steel rods or wires 14. Paper, wood, grease or polyethylene or steel, magnesium or aluminum shapes, steel wool, aluminum mesh or other combustible metal structures such as washers, nuts and spacers may be used as the additional fuel 38.

FIG. 5 discloses a third embodiment of the present invention which is similar to the second embodiment shown in FIG. 4, with the exception of an electrical match 50 to burn additional fuel 52. As shown in FIG. 5, a tube 54 encloses a small amount of fuel 52 and a small electric match 50 therein. The tube 54 may be made of a polyethylene material and is placed between plug 34 and end 12 of internal tube 8, as in the first and second embodiments shown in FIGS. 1 and 4, respectively. The fuel 52 may preferably be a small quantity of grease contained in a ¼ of one inch long tube 54. The advantage of using a small match is that if the unit accidentally ignites when there is no oxygen flow, there is no danger of an accidental ignition, since the heat output from the match is very low. A simple heating element dipped in grease, or simply wrapped in paper, may be substituted for the match 50.

FIG. 6 discloses a fourth and the final embodiment of the present invention which is similar to the third embodiment of the present invention disclosed in FIG. 5, with the exception of wiring 56 for an electric match 58. The wiring 56 is brought out through the plug 34. As in the third embodiment, shown in FIG. 5, fuel 60 is placed adjacent the electric match 58 for its ignition.

Figure 7:
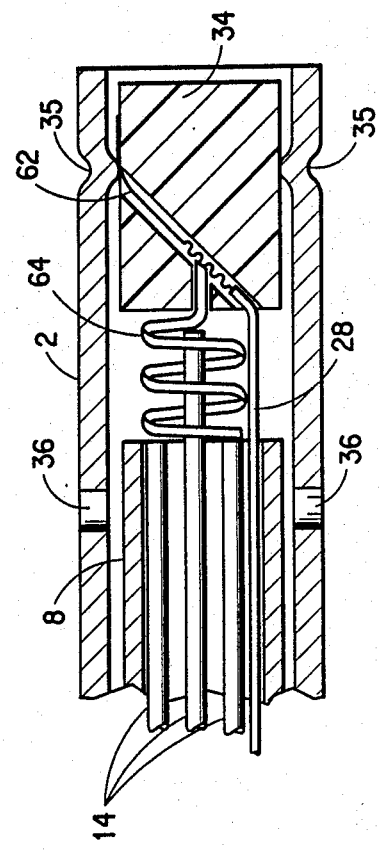
FIG. 7 is a cross-sectional fragmentary view of alternative ignition means for the cutting device of the present invention.

FIG. 7 shows an embodiment in which an ignition cord 64 is wrapped about a rod 14. Electrical current is passed through insulated wire 28 to bare igniter wire 62 igniting cord 64.

Figure 8:
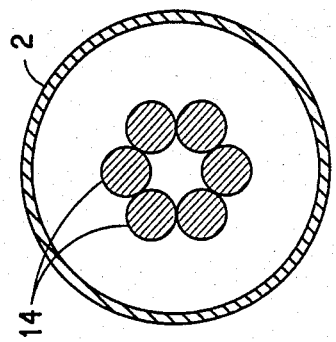
FIG. 8 is a cross-sectional view of an embodiment of the cutting device of this invention in which the functions of the internal tube and fusible rods are combine.

Although the squib 20 has been shown in FIGS. 1-4 to be positioned between internal tube 8 and plug 34, it should be noted that it may alternatively be positioned alongside rods 14, or inside an auxiliary fuel structure attached to the rods 14. In addition, it should also be noted that the device of the present invention functions equally well without the presence of the internal tube 8, in which case the squib 20 may either be located at the end or alongside the rods 14 within an external tube 2. In such an embodiment as shown in cross-section in FIG. 8 rods 14 are grouped to form a passage for the flow of oxygen from a source to the ignition device.

While this invention has been described as having a preferred design, it is understood that it is capable of further modifications, uses and/or adaptations of the invention and following in general the principle of the invention and including such departures from the present disclosure as has come within known customary practice in the art to which the invention pertains, and as may be applied to the central features hereinbefore set forth, and fall within the scope of the invention and of the limits of the claims appended hereto.

What is claimed is:

1. A cutting device, comprising:
   (a) an elongate external tube means open at least at one end thereof;
   (b) ignition means disposed within said external tube means;
   (c) a plurality of consumable elements disposed within said external tube means with one end adjacent said ignition means and spaced within said external tube means to define a flow path for a gas generally coaxial with said external tube means and having an exit adjacent said ignition means;
   (d) said external tube means including at least one opening for exhausting combustion gases therethrough and disposed about the periphery thereof in relation to the exit of said flow path whereby the flow of said gases exiting said flow path is reversed before they are exhausted; and
   (e) means for sealing at least one end of said external means.

2. A cutting device, comprising:
   (a) an elongate external tube means open at least at one end thereof;
   (b) an elongate internal tube means having a length substantially less than said external tube means and disposed coaxially within said external tube means;
   (c) ignition means disposed within said external tube means at a location between one end of said internal tube means and an end of said external tube means;
   (d) a plurality of consumable elements disposed within said internal tube means, said elements being spaced within said internal tube means to permit the flow of gas therethrough along a flow path from one end of said consumable elements to an exit adjacent said ignition means;
   (e) said external tube means including at least one opening for exhausting combustion gases therethrough and disposed about the periphery thereof in relation to the exit of said flow path whereby the flow of said gases exiting said flow path is reversed before they are exhausted; and
   (f) means for sealing at least one end of said external means.

3. The device of claim 2, wherein:
   (a) said at least one opening is located adjacent said one end of said consumable elements but away from said ignition means.

4. The device of claim 2, wherein:
   (a) said ignition means is disposed between said consumable elements and said sealing means.

5. The device of claim 4, wherein:
   (a) said ignition means includes a squib.

6. The device of claim 5, further comprising fuel means disposed between said squib and said consumable elements.

7. An underwater cutting device, comprising:
   (a) an elongate external tube means open at least at one end thereof;
   (b) an elongate internal tube means disposed coaxially within said external tube means;
   (c) ignition means disposed within said external tube means at a location between one end of said internal tube means and an end of said external tube means;
   (d) a plurality of consumable elements disposed within said internal tube means, said elements being spaced within said internal tube means to permit the flow of gas therethrough along a flow path from one end of said consumable elements to an exit adjacent said ignition means;
   (e) means for conveying oxygen along said flow path to, around, and away from said exit adjacent said ignition means and including at least one opening for exhausting combustion gases disposed about the periphery of said external tube means in relation to the exit of said flow path whereby the flow of said gases exiting said flow path is reversed before they are exhausted; and
   (f) means for sealing said at least one end of said external means.

8. An underwater cutting torch, comprising;
   (a) an elongate external tube means open at least at one end thereof;
   (b) an elongate internal tube means disposed coaxially within said external tube means;
   (c) a plurality of consumable rods housed within said internal tube means, said rods being spaced within said internal tube means to permit the flow of gas therethrough along a flow path;
   (d) plug means for sealing said at least one end of said external tube means;
   (e) ignition means positioned between said plug means and the exit of said flow path at one end of said consumable rods;
   (f) said external tube means including a plurality of openings for exhausting combustion gases therethrough and disposed about the periphery thereof in relation to the exit of said flow path whereby the flow of gases exiting said flow path is reversed before they are exhausted; and
   (g) said openings being positioned so as to be adjacent to said one end of said consumable rods but away from said ignition means.

9. The device of claim 7 or claim 8, wherein:
   (a) said ignition means is a squib; and
   (b) said squib comprises boron, ferric oxide ignition charge and a magnesium, ferric oxide, and potassium perchlorate base charge encased in an aluminum shell.

* * * * *